United States Patent [19]

Blaetz

[11] 4,068,832

[45] Jan. 17, 1978

[54] DASHER

[75] Inventor: Philip H. Blaetz, Barrington, Ill.

[73] Assignee: Kraft, Inc., Glenview, Ill.

[21] Appl. No.: 638,291

[22] Filed: Dec. 8, 1975

[51] Int. Cl.² .................. A01J 11/00; A23C 1/00; B01F 7/00
[52] U.S. Cl. .................................. 366/280; 99/452
[58] Field of Search ............ 259/5, 8, 21, 23, 43, 259/21, 40, 102, 107; 99/462–463; 62/68

[56] References Cited

U.S. PATENT DOCUMENTS

| 2,170,280 | 8/1939 | Sharp | 259/102 |
|---|---|---|---|
| 2,355,539 | 8/1944 | Lawton | 259/102 |
| 2,657,022 | 10/1953 | Spiess | 259/6 |
| 3,214,147 | 10/1965 | Wakeman | 259/6 |

Primary Examiner—Leonard D. Christian
Assistant Examiner—Robert Pous
Attorney, Agent, or Firm—Fitch, Even, Tabin & Luedeka

[57] ABSTRACT

A dasher is described for whipping fluid food products in a chamber. In this embodiment the dasher includes axially spaced frame members supported in the chamber and at least two cages mounted between the frame members. At least one of the cages is radially displaced from a longitudinal axis of the chamber. At least one of the cages is rotatable with respect to one of the other cages.

6 Claims, 5 Drawing Figures

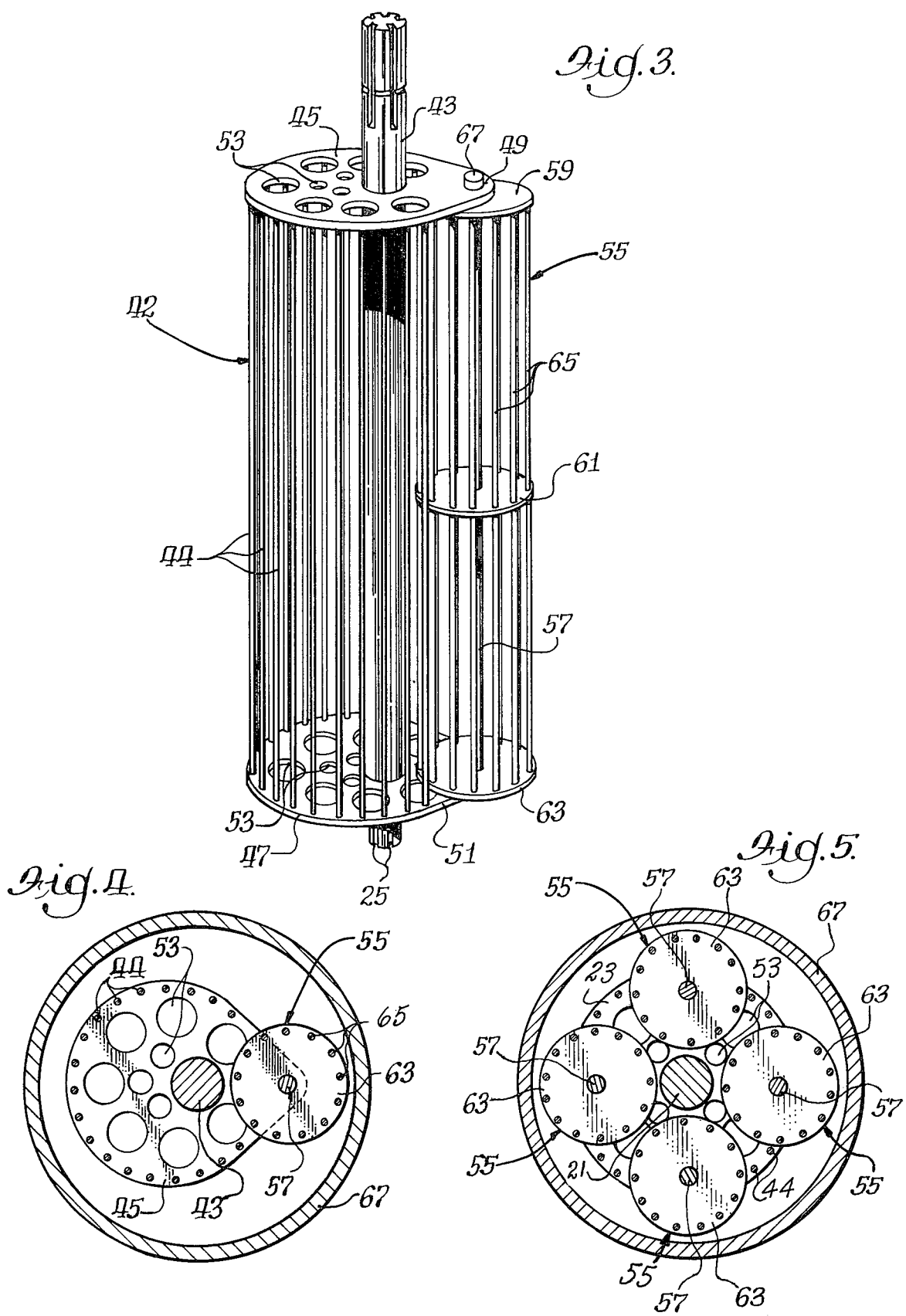

DASHER

This invention relates generally to food processing equipment and, more particularly, to an improved dasher for whipping fluid food products.

In the processing of many fluid or semifluid food products, it is desirable to agitate or whip the food products in order to incorporate air therein and thus make the food products lighter and more palatable. Continuous processing machinery for whipping food products are described in U.S. Pat. No. 3,608,325 to Hock, issued Sept. 28, 1971, and U.S. Pat. No. 3,667,244 to Hock et al, issued June 6, 1972. Both these patents are assigned to the assignee of the present invention.

Continuous whippers include an elongated cylindrical whipping chamber having a rotatable whipping element mounted therein, which is referred to in the art as a dasher. Typically a dasher includes a frame which supports a plurality of elongated bars and scraper blades defining a cylindrical cage, the elongated bars extending parallel to the axis of the whipping chamber.

The frame may include a pair of axially spaced plates mounted on a drive shaft. When the drive shaft is rotated, the cage rotates and whips the fluid food product passing through the chamber in which the dasher is mounted. In this way, air is incorporated in the food product. Conventional dashers generally include one or more scraper bars mounted on the exterior of the cage for scraping the material from the wall of the whipping chamber.

Although successful in many applications, present whipping apparatus incorporating dashers has been somewhat limited in attainable flow rates for the material being whipped. Moreover, there has been a tendency for an upper limitation to exist on the percentage of air incorporated in the whipped fluid food product, particularly as the flow rate through the apparatus is increased.

It is an object of the present invention to provide an improved dasher for whipping fluid food products.

Another object of the invention is to provide a dasher which is capable of increasing the flow rate of food products being processed for a given level of air incorporated therein.

It is a further object of the invention to provide a dasher which is capable of incorporating a very high amount of air into whipped fluid food product, and where said air is retained in said food product for an extended period of time.

Other objects of the invention will become apparent to those skilled in the art from the following description, taken in connection with the accompanying drawings wherein:

FIG. 3 is a perspective view of a dasher illustrating a further embodiment of the invention;

FIG. 4 is a cross section view of the dasher of FIG. 3 showing it incorporated in a fluid food product processing chamber, and FIG. 5 is a full cross section view of FIG. 3 illustrating a further embodiment of the invention.

Very generally, the dasher of the invention, which is adapted for mounting within a whipping chamber, includes a supporting frame work, indicated generally at 11, 13, at least two cages 15, 17 carried by said frame work, with at least one of the cages 15, 17 radially displaced from the axis of the dasher, and at least one of the cages 15, 17 adapted for rotation relative to the other cage.

Figure 1:
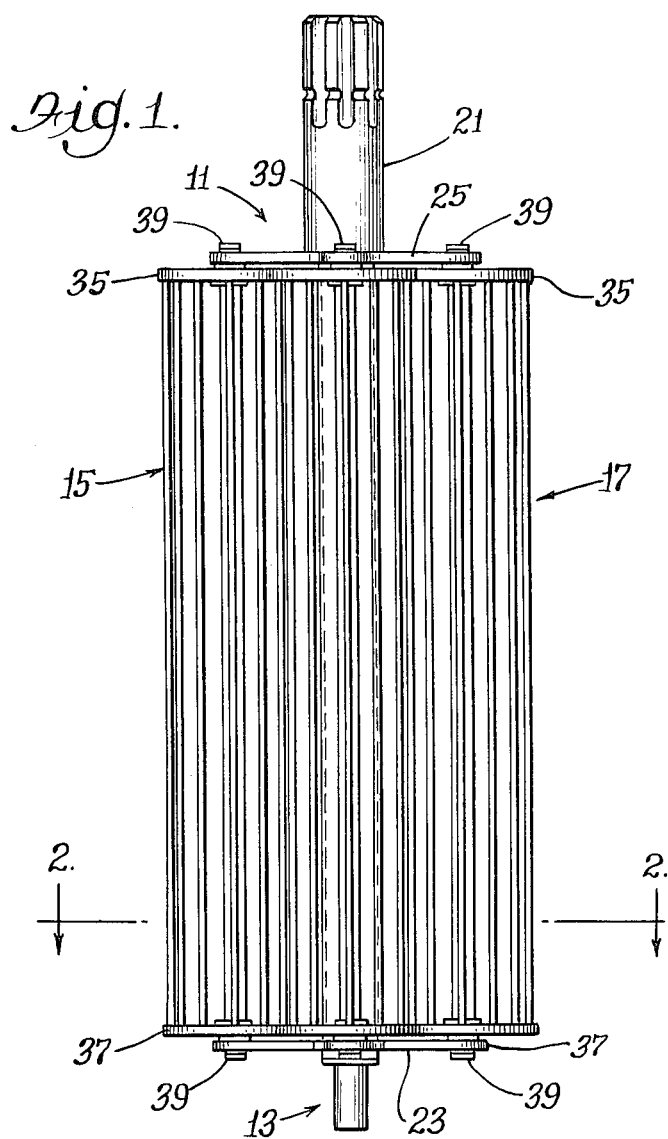
FIG. 1 is a side view of a dasher constructed in accordance with the invention.
Figure 2:
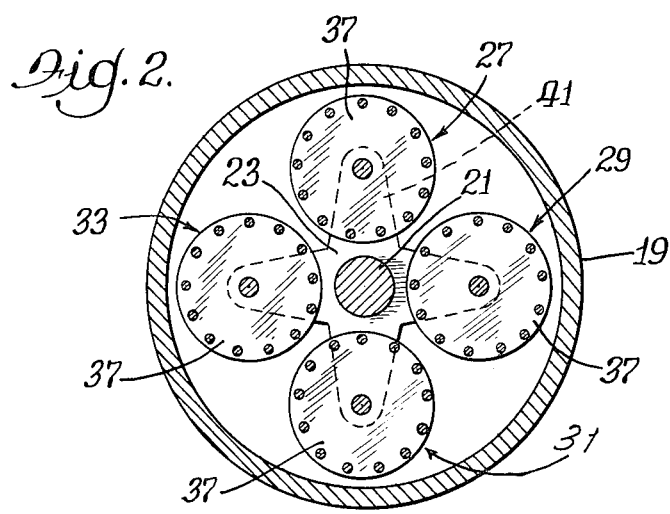
FIG. 2 is a full cross section view of the dasher of FIG. 1 showing it incorporated in a fluid food product processing chamber.

Referring more particularly to FIGS. 1 and 2 there is illustrated a preferred embodiment of the invention which has been found useful in the whipping of food emulsions which are chilled but not fully frozen during whipping. The dasher is placed within an elongated generally cylindrical whipping chamber 19 shown in cross-section in FIG. 2. The food emulsion is pumped into one end of the whipping chamber along with a supply of gas such as air, carbon dioxide, nitrogen and the like. During passage through the whipping chamber the emulsion and air are subjected to violent agitation and shear imparted by the dasher. The chemical formula and physical condition of the emulsion cause the air to become entrapped within the emulsion during agitation resulting in a whipped air incorporating product being delivered from the exit of the whipping chamber. The selection of ingredients for the food emulsion to be whipped and the preparation of the emulsion in the proper physical condition for whipping are well known and within the skill of the art and need not be further discussed herein.

The supporting framework 11, 13 of the dasher illustrated in FIG. 1 includes a drive shaft 21 having axially spaced end plates 23, 25 secured thereto by suitable means (not shown) for rotation with the drive shaft. The end of the drive shaft 21 is slotted to engage a further shaft or gear for coupling to a motor (not shown).

As best seen in FIG. 2, the end plates 23, 25 are in the form of a spider to offer least resistance to flow of the emulsion being whipped through the whipping chamber. Other shapes are contemplated, as for example the structures illustrated in connection with FIGS. 4 and 5.

A plurality of elongated wire cages 27, 29, 31, 33 are rotatably mounted between the arms of the spiders 23, 25. Each of the cages includes axially spaced end plates 35, 37 rotatably mounted on spiders 23, 25 by means of suitable bushings 39.

The embodiment illustrated in FIGS. 1 and 2 is adapted for use with any plural number of satellite cages, such as two, three, four, five or six. The spiders 23, 25 are constructed to provide uniformly circumferentially spaced arms 41 upon which each of the cages are mounted.

Referring now to FIGS. 3, 4, and 5, a further embodiment of the dasher whipping fluid food products such as dessert mixes which are chilled but not frozen during the whipping process is illustrated.

The dasher shown in FIG. 3 comprises main cage 42, which includes a drive shaft 43 upon which are supported a pair of support plates or frame means 45 and 47 axially spaced along the shaft. One or more intermediate plates (not shown) may also be provided for stiffening the dasher, if necessary. The plates are substantially circular except for a tangentially contoured bulge on each plate, indicated at 49 and 51, respectively. The axis of rotation passes through the plates such that the outer periphery of the cages is within a desired distance from the inner surface of the whipping chamber.

The plates are mounted on the drive shaft by any suitable means, such as by welding, force fit, etc. It is preferred that the material of which the dasher is comprised be a stainless steel. The ends of the drive shaft 43 are slotted to engage a further shaft or gear for coupling the drive shaft to a drive motor (not shown).

A plurality of elongated elements or rods 44 are attached at the outer peripheries of the plates 45 and 47 and extend parallel with each other and parallel with the drive shaft or axis of rotation. These rods or elements 44 are attached to the plates in peripheral holes by any suitable means, such as by welding. Holes 53 of assorted sizes are provided in the end plates 45 and 47 to allow the flow of fluid being processed.

A satellite cage 55 is mounted to the main cage for rotation with respect thereto near the periphery of the main cage. The satellite cage is comprised of a central shaft 57 and a plurality of two or more axially spaced plates which form frame means which rotate on the shaft 57. As shown in FIG. 3, three axially spaced plates 59, 61 and 63 are used. A plurality of elongated rods or elements 65 are mounted around the peripheries of the plates 59, 61 and 63 to extend parallel with each other and parallel with the shaft 57. The rods extend through peripheral holes in the plate 61 and terminate in peripheral holes in the plates 59 and 63. The rods 65 are secured to the plates by any suitable means such as by welding. The satellite cage 55 is free to rotate with respect to the main cage defined by plates 45, 47 and rods 44 in bearings 67 at each end of the shaft 57. The bearings are supported near the tips of the bulges 49 and 51.

Referring to FIG. 5, an alternative embodiment of the invention is shown. In FIG. 5, rather than a single satellite cage, four satellite cages are employed, each identical and being mounted in the manner in which the satellite cage 55 was described in the embodiment of FIGS. 3 and 4.

With the dasher of the invention, the flow rate of fluid food product whipped to a given percentage of air is markedly improved over prior art devices. Moreover, in a given time period, the dasher of the invention is capable of incorporating substantially more air into the whipped product than prior art devices. In this connection, the embodiment of the dasher of the present invention, as set forth in FIG. 3, when used to provide a chilled, whipped product having 200 percent overrun is capable of a flow rate of about 30 percent of the capacity of a commercial ice cream freezer used to freeze ice cream having an overrun of 100 percent. The embodiment of the dasher, set forth in FIG. 5, is capable of about 160 percent of this capacity.

When the dasher of the invention is used for whipping fluid food products which are frozen during the whipping process, it may be desirable to mount a scraper device extending peripherally of the dasher in order to scrape the interior surface of the processing chamber. Such scrapers are well known in the art and therefore are not illustrated in connection with the present invention.

It may therefore be seen that the invention provides an improved dasher for whipping fluid food products in a chamber. The dasher is capable of producing higher flow rates for a given percentage of air in the end product, or is capable of producing a higher percentage of air in the end product for a given flow rate.

Various modifications of the invention in addition to those shown and described herein will become apparent to those skilled in the art from the foregoing description and accompanying drawings. Such modifications are intended to fall within the scope of the appended claims.

What is claimed is:

1. A dasher adapted for mounting within a generally cylindrical whipping chamber, said dasher comprising a drive shaft defining a first axis of rotation, a pair of support plates affixed to said drive shaft in axially spaced relation thereon, said support plates lying in substantially parallel planes generally perpendicular to said first axis of rotation, at least two cages mounted between said support plates, each of said cages including a pair of substantially parallel axially aligned end plates having a plurality of elongate elements secured therebetween in substantially normal relation thereto, said elongate elements of each cage having their longitudinal axes intersecting a circle lying in a plane disposed normal to said axes and said elongate elements being disposed in equidistantly circumferentially spaced relation about said circle, each of said cages being freely rotatable relative to said support plates for rotation about an axis parallel and eccentric to said first axis and without interference with said chamber.

2. A dasher according to claim 1 wherein said cages comprise two satellite cages.

3. A dasher according to claim 1 including three satellite cages.

4. A dasher according to claim 3 including four satellite cages.

5. A dasher in accordance with claim 1 wherein the whipping chamber defines a longitudinal axis, and wherein the axis of said drive shaft is coincident with the axis of the chamber.

6. In an elongate cyndrical chamber defining a longitudinal axis, a dasher disposed within said chamber for whipping fluid food products passing axially through said chamber, said dasher including a rotatable drive shaft having an axis coincident with the axis of said chamber, a plurality of support plates fixed to said drive shaft and spaced axially thereon, a plurality of satellite cages mounted to and between said support plates for rotation relative thereto about axes parallel and eccentric to the axis of said drive shaft, said satellite cages each including a pair of axially aligned and substantially parallel spaced end plates rotatably supported on said support plates, each of said pairs of end plates having a plurality of elongate elements supported therebetween in substantially parallel spaced relation to each other and to said axes of rotation, said satellite cages being freely rotatable about their own axes and said axis of said drive shaft without interference with said chamber.

* * * * *